United States Patent
Wan et al.

(10) Patent No.: US 9,045,316 B2
(45) Date of Patent: Jun. 2, 2015

(54) CONCRETE DISTRIBUTING DEVICE AND CONTROL METHOD, CONTROL SYSTEM AND ELECTRICAL CONTROL SYSTEM FOR COMPOSITE MOTION OF BOOM THEREOF

(75) Inventors: Liang Wan, Changsha (CN); Jiaqian Wang, Changsha (CN); Peilin Li, Changsha (CN); Shuai Wang, Changsha (CN)

(73) Assignees: ZOOMLION HEAVY INDUSTRY SCIENCE AND TECHNOLOGY CO., LTD., Changsha (CN); HUNAN ZOOMLION SPECIAL VEHICLE CO., LTD., Changde, Hunan (CN)

( * ) Notice: Subject to any disclaimer, the term of this patent is extended or adjusted under 35 U.S.C. 154(b) by 459 days.

(21) Appl. No.: 13/394,189

(22) PCT Filed: Mar. 24, 2011

(86) PCT No.: PCT/CN2011/072117
§ 371 (c)(1),
(2), (4) Date: Jun. 18, 2012

(87) PCT Pub. No.: WO2011/116700
PCT Pub. Date: Sep. 29, 2011

(65) Prior Publication Data
US 2012/0253528 A1 Oct. 4, 2012

(30) Foreign Application Priority Data

Mar. 26, 2010 (CN) .......................... 2010 1 0155584

(51) Int. Cl.
*G05D 7/00* (2006.01)
*B66C 13/06* (2006.01)
(Continued)

(52) U.S. Cl.
CPC ............... *B66C 13/066* (2013.01); *B66C 13/20* (2013.01); *E04G 21/0463* (2013.01); *E04G 21/0418* (2013.01)

(58) Field of Classification Search
CPC .. B66C 13/066; B66C 13/20; E04G 21/0418; E04G 21/0463
USPC .......................................... 700/275, 282, 283
See application file for complete search history.

(56) References Cited

U.S. PATENT DOCUMENTS 5,062,350 A * 11/1991 Tanaka et al. .................... 91/448
5,079,919 A * 1/1992 Nakamura et al. .............. 60/426
(Continued)

Primary Examiner — Charles Kasenge
(74) Attorney, Agent, or Firm — Volpe and Koenig, P.C.

(57) ABSTRACT

Disclosed are a concrete distributing device and a control method, a control system and an electrical control system for composite motion of a boom thereof. The control method comprises the steps as follows: calculating the flow of a boom pump when an operating handle sends a command; according to the command sent by the operating handle, calculating theoretical demand flow of all actuating mechanisms of the boom and theoretical control signals of all electronic proportional control valves; comparing the total theoretical demand flow of the actuating mechanisms with the flow of the boom pump; providing the theoretical control signals to all the electronic proportional control valves when the flow of the boom pump is greater than or equal to the total theoretical demand flow of the actuating mechanisms, otherwise, providing actual control signals smaller than the theoretical control signals to all the electronic proportional control valves and reducing the movement speeds of all the actuating mechanisms proportionally. In this way, when undersaturation of system occurs to the composite motion of the boom, the movement speeds of all the actuating mechanisms are reduced proportionally independent of the load difference of the actuating mechanisms, thereby ensuring that the boom can move in a motion track expected by an operator.

11 Claims, 3 Drawing Sheets

(51) Int. Cl.
  *B66C 13/20* (2006.01)
  *E04G 21/04* (2006.01)

(56) References Cited

U.S. PATENT DOCUMENTS

| | | | |
|---|---|---|---|
| 5,107,753 A * | 4/1992 | Ioku | 91/512 |
| 5,116,186 A * | 5/1992 | Hanamoto et al. | 414/694 |
| 5,178,510 A * | 1/1993 | Hanamoto et al. | 414/694 |
| 5,447,027 A * | 9/1995 | Ishikawa et al. | 60/420 |
| 5,481,875 A * | 1/1996 | Takamura et al. | 60/443 |
| 6,308,516 B1 * | 10/2001 | Kamada | 60/450 |
| 6,397,591 B1 * | 6/2002 | Tsuruga et al. | 60/422 |
| 6,408,622 B1 * | 6/2002 | Tsuruga et al. | 60/422 |
| 2011/0197576 A1 * | 8/2011 | Wada et al. | 60/413 |

* cited by examiner

CONCRETE DISTRIBUTING DEVICE AND CONTROL METHOD, CONTROL SYSTEM AND ELECTRICAL CONTROL SYSTEM FOR COMPOSITE MOTION OF BOOM THEREOF

TECHNICAL FIELD

The present invention relates to a concrete distributing device, a control system for controlling the composite motion of a boom of concrete distributing device, a control method for controlling the composite motion of a boom of concrete distributing device, and an electrical control system for controlling the composite motion of a boom of concrete distributing device.

BACKGROUND OF THE INVENTION

The boom of concrete distributing device usually comprises 3-6 knuckle arms, each of which is controlled by an actuating mechanism to stretch out or fold back.

Presently, hydraulic systems for boom control of concrete distributing devices are usually single loop hydraulic systems that employ a single pump and a plurality of actuating mechanisms.

To ensure the plurality of actuating mechanisms can act simultaneously and the movement speeds of the actuating mechanisms can be regulated steplessly independent of the load, the hydraulic system is usually a load-sensitive hydraulic system with pressure compensation function. Hereunder a hydraulic system with two actuating mechanisms will be described as an example.

FIG. 1 shows a hydraulic system with two actuating mechanisms. The following functional relation exists in the hydraulic system shown in FIG. 1:

$$\Delta P_1 = P_1' - P_1 = F_1/S_1; \Delta P_2 = P_2' - P_2 = F_2/S_2$$

$$Q_1 = \lambda A_1 \sqrt{\frac{2\Delta P_1}{\rho}}; Q_2 = \lambda A_2 \sqrt{\frac{2\Delta P_2}{\rho}}$$

Once the pressure of reducing valve 1 and reducing valve 2 is set, the flow through the actuating mechanism 1 and actuating mechanism 2 (i.e., the movement speed of the actuating mechanisms) will only depend on the opening area $A_1$ and $A_2$ of the electrical proportional control valves, and will be irrelevant to the load, i.e.:

$$Q_1 = f(A_1); Q_2 = f(A_2)$$

FIG. 2 is a structural block diagram of boom control system on most of the existing concrete distributing devices. The operator sends a boom action instruction via the operating handle, a receiver/emitter (transceiver) receives the instruction and then directly converts the instruction into control signals $i_1, i_2 \ldots i_n$ for the electrical proportional control valves, and thereby outputs flows $Q_1, Q_2 \ldots Q_n$ to the actuating mechanisms respectively; the relation between the control signals $i_1, i_2 \ldots i_n$ and flows $Q_1, Q_2 \ldots Q_n$ depends on the characters of the valves.

In the prior art, when a plurality of knuckle arms move in a composite manner, if the sum of the flows demanded by the oil cylinders (actuating mechanisms) of all knuckle arms is greater than the maximum flow output from the pump of the boom, i.e.:

$$Q_S < \sum_{i=1}^{n} Q_i$$

The drawback of load-sensitive hydraulic system will be exposed, i.e., the flow is taken to meet the demand of knuckle arms that bear lower loads, while the speeds of movement of knuckle arms that bear higher loads can't reach the values expected by the operator; as a result, the motion track of the boom end will deviate from that expected, and the operator has to change the openness of the operating handle continually to correct the motion track, and thereby the labor intensity is severely increased, and the operating efficiency and movement stability of the boom are compromised.

For example, during the operation of the boom of a concrete pump truck, the load is the lowest in revolving motion; if the knuckle arms revolve and stretch out at the same time, the stretching speed of the boom may be very low or even the boom can't stretch out; consequently, the motion track of the boom end will deviate from that expected.

As shown in FIG. 3, the load of boom revolution is 100 bar, while the load of boom stretching is 200 bar; it is seen from the flow curve of boom revolution and the flow curve of boom stretching: the flow of the hydraulic system is taken to meet the demand of boom revolution first, while only the surplus part of flow is taken to meet the demand of boom stretching.

SUMMARY OF THE INVENTION

To solve the problem of motion track deviation of boom during composite motion due to under-saturation of flow, an object of the present invention is to provide a control method for controlling the composite motion of a boom of concrete distributing device, so as to control the motion track of the boom.

Another object of the present invention is to provide a control system for controlling the composite motion of a boom of concrete distributing device.

Another object of the present invention is to provide an electrical control system for controlling the composite motion of a boom of concrete distributing device.

Another object of the present invention is to provide a concrete distributing device.

To attain the above objects, the present invention provides a control method for controlling the composite motion of a boom of concrete distributing device, comprising the following steps: calculating the flow of a boom pump when an instruction is sent from an operating handle; and calculating the theoretical demanded flows for each of the actuating mechanisms of the boom and the theoretical control signals for each of the electrical proportional control valves corresponding to the actuating mechanisms, according to the instruction sent from the operating handle; comparing the sum of the theoretical demanded flows for the actuating mechanisms with the flow of the boom pump; and providing the theoretical control signals to the electrical proportional control valves when the flow of the boom pump is greater than or equal to the sum of the theoretical demanded flows of the actuating mechanisms; otherwise providing actual control signals smaller than the theoretical control signals to the electrical proportional control valves, thereby reducing the movement speeds of the actuating mechanism proportionally.

Preferably, both the theoretical control signals and the actual control signals for the electrical proportional control valves are current signals.

Preferably, the theoretical control signals for the electrical proportional control valves are current signals $i_1, i_2 \ldots i_n$, signals are current signals $i_1', i_2' \ldots i_n'$, when the sum of the theoretical demanded flows A of the actuating mechanisms is greater than the flow actually provided by the boom pump B, the actual control signals for the electrical proportional control valves are $i_n'=k*i_n+(1-k)i_{n0}$, where, the coefficient k=B/A, and $i_{n0}$ is the minimum current control signal for the electrical proportional control valves.

Preferably, both the theoretical control signals and the actual control signals for the electrical proportional control valves are voltage signals.

Preferably, the flow of the boom pump is calculated according to the rotation speed and displacement of the boom pump.

Preferably, the boom is controlled by a load-sensitive hydraulic system with pressure compensation function.

The present invention further provides an electrical control system for controlling the composite motion of a boom of concrete distributing device, comprising: a receiving unit, configured to receive instructions from an operating handle of the concrete distributing device; a calculating unit, configured to calculate the flow of the boom pump, and calculate the theoretical demanded flows for each of the actuating mechanisms of the boom and the theoretical control signals for each of proportional control valves corresponding to the actuating mechanisms according to the instruction sent from the operating handle; a comparing unit, configured to compare the sum of the theoretical demanded flows for the actuating mechanisms with the flow of the boom pump; and a control unit, configured to provide the theoretical control signals to the proportional control valves when the flow of the boom pump is greater than or equal to the sum of the theoretical demanded flows of the actuating mechanisms, otherwise provide actual control signals smaller than the theoretical control signals to the proportional control valve and thereby reduce the movement speeds of the actuating mechanisms proportionally.

Preferably, the calculating unit calculates the flow of the boom pump according to the displacement of the boom pump and the signals from a sensor detecting the rotation speed of the boom pump.

Preferably, the theoretical control signals for the electrical proportional control valves are current signal $i_1, i_2 \ldots i_n$, and the actual control signals are current signal $i_1', i_2' \ldots i_n'$, when the sum of the theoretical demanded flows A of the actuating mechanisms is greater than the flow actually provided by the boom pump B, the actual control signals for the electrical proportional control valves are $i_n'=k*i_n+(1-k)i_{n0}$, where, the coefficient k=B/A, and $i_{n0}$ is the minimum current control signal for the electrical proportional control valves.

In addition, the present invention further provides a control system for controlling the composite motion of a boom of concrete distributing device, comprising the above-mentioned electrical control system, wherein, the receiving unit of the electrical control system is connected via signals with the operating handle, and the control unit of the electrical control system is connected via signals with the proportional control valves corresponding to the actuating mechanisms of the boom.

Preferably, a receiver/emitter for wireless or wired connection is arranged between the electrical control system and the operating handle.

Preferably, the electrical control system is connected via signals with a sensor detecting the rotation speed of the boom pump, and calculates the flow of the boom pump according to the displacement of the boom pump and the signals from the sensor.

In addition, the present invention further provides a concrete distributing device, comprising the above-mentioned electrical control system for controlling the composite motion of a boom of concrete distributing device.

In addition, the present invention further provides a concrete distributing device, comprising the above-mentioned control system for controlling the composite motion of a boom of concrete distributing device.

According to the present invention, when the system flow is under-saturated during the composite motion of the boom, the movement speeds of the actuating mechanisms will be reduced proportionally, independent of the load difference among the actuating mechanisms, so as to ensure the boom can move along a motion track expected by the operator.

The present invention has other objects, characteristics, and advantages, besides those described above. Hereunder the present invention will be further detailed, with reference to the accompanying drawings.

BRIEF DESCRIPTION OF THE DRAWINGS

The accompanying drawings constitute a part of the present description and are provided to further understand the present invention. The drawings show preferred embodiments of the present invention and are used together with the present description to explain the principle of the present invention. In the drawings.

DETAILED DESCRIPTION OF THE EMBODIMENTS

Hereunder embodiments of the present invention will be described with reference to the accompanying drawings. However, it should be appreciated that the present invention can be implemented in different ways confined and covered by the claims.

Figure 4:
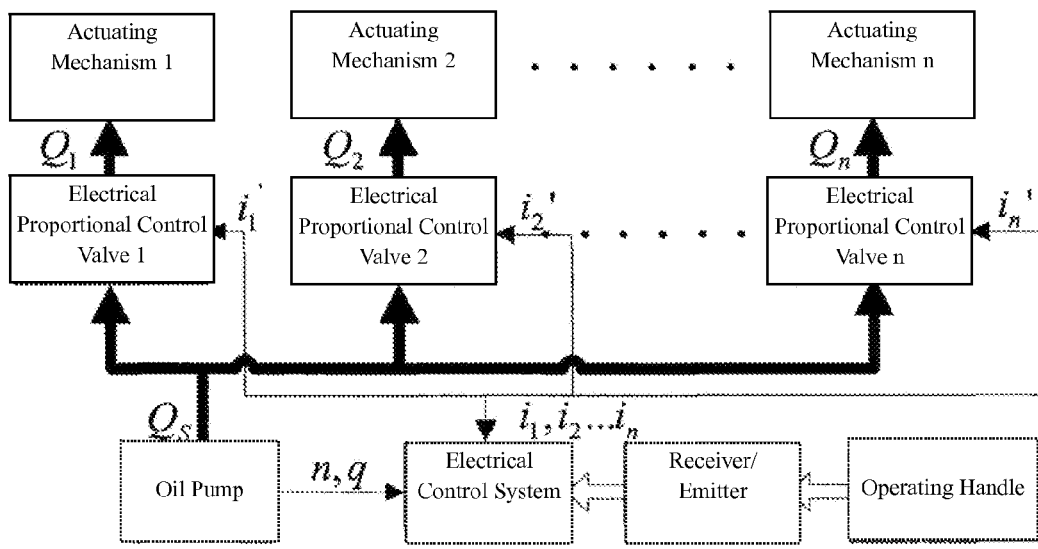
FIG. 4 is a schematic diagram of a control system for controlling the composite motion of a boom of concrete distributing device in the present invention.

FIG. 4 is a schematic diagram of a control system for controlling the composite motion of a boom of concrete distributing device in the present invention. As shown in FIG. 4, the control system for a boom of concrete distributing device provided in the present invention comprises an electrical control system, which is connected via signals with an operating handle and is also connected via signals with a sensor that detects the rotation speed of a boom pump, and calculates the flow of the boom pump according to the displacement of the boom pump and the signals from the sensor.

A receiver/emitter for wireless or wired connection is arranged between the electrical control system and the operating handle. When the boom of concrete distributing device operates, the operator sends boom motion instructions via the operating handle, and the receiver/emitter transmits the instructions to the electrical control system through a bus when it receives the instructions.

The electrical control system calculates the theoretical demanded flows $Q_1, Q_2 \ldots Q_n$ for each of the actuating mechanisms of the boom and the corresponding theoretical control signals $i_1, i_2 \ldots i_n$ for each of the electrical proportional control valves for the actuating mechanisms (the theoretical control signals are not limited to current signals, and the relation between control signals and output flows depends on the characters of the valves; for example, the theoretical control signals can also be voltage signals).

In addition, the electrical control system calculates the maximum flow $Q_s$, that can be provided by the system at that time according to the rotation speed N and displacement q of the pump.

Through analysis and judgment, the electrical control system outputs actual control signals $i_1', i_2', \ldots i_n'$ to the electrical proportional control valves respectively (likewise, the actual control signals are not limited to current signals, for example, they can also be voltage signals, etc.). The judgment process is as follows:

$$\text{If } Q_S \geq \sum_{i=1}^{n} Q_i, \text{ then}$$

$$i_1' = i_1$$
$$i_2' = i_2$$
$$\vdots$$
$$i_n' = i_n$$

$$\text{If } Q_S < \sum_{i=1}^{n} Q_i, \text{ then}$$

$$k = \frac{Q_s}{\sum_{i=1}^{n} Q_i}$$

$$i_1' = k * i_1 + (1-k)i_{10}$$
$$i_2' = k * i_2 + (1-k)i_{20}$$
$$\vdots$$
$$i_n' = k * i_n + (1-k)i_{n0}$$

In addition, the control signals for the electrical proportional control valve meet the following relationship:

$$i_{10} \leq i_1' \leq i_1 \leq i_{1max}$$
$$i_{20} \leq i_2' \leq i_2 \leq i_{2max}$$
$$\vdots$$
$$i_{n0} \leq i_n' \leq i_n \leq i_{nmax}$$

In the above formulae, $i_{10}, i_{20} \ldots i_{n0}$ are minimum current (voltage) control signals for the electrical proportional control valves, at which the actuating mechanisms are in the critical motion state; $i_{1\,max}, i_{2\,max} \ldots i_{n\,max}$ are maximum current (voltage) control signals for the electrical proportional control valves, at which the actuating mechanisms are in the permitted maximum movement speed state. To ensure that the control system is adaptive to all relevant devices, the values of $i_{10}, i_{20} \ldots i_{n0}$ and $i_{1\,max}, i_{2\,max} \ldots i_{n\,max}$ are obtained by calibration in the commissioning process of the complete machine.

Apparently, after the electrical control system is introduced into the control system, when the system flow is under-saturated during the composite motion of the boom, the movement speeds of the actuating mechanisms will be reduced proportionally, independent of the load difference among the actuating mechanisms, so as to ensure the boom can move along a motion track expected by the operator. It is noted: though the claims and patent description of the present invention make mention of "the movement speeds of the actuating mechanisms are reduced proportionally", it is understood from the present description that the ratios of actual control signals $i_1', i_2' \ldots i_n'$ to theoretical control signals $i_1, i_2 \ldots i_n$ for the electrical proportional control valves may not always absolutely equal to k, which is to say, the ratios are also related with the minimum control signals $i_{10}, i_{20} \ldots i_{n0}$ for the electrical proportional control valves. Therefore, "reduce proportionally" mentioned in the context doesn't implicit "reduce proportionally at the same ratio absolutely", but means "reduce proportionally at specific ratios".

Figure 5:
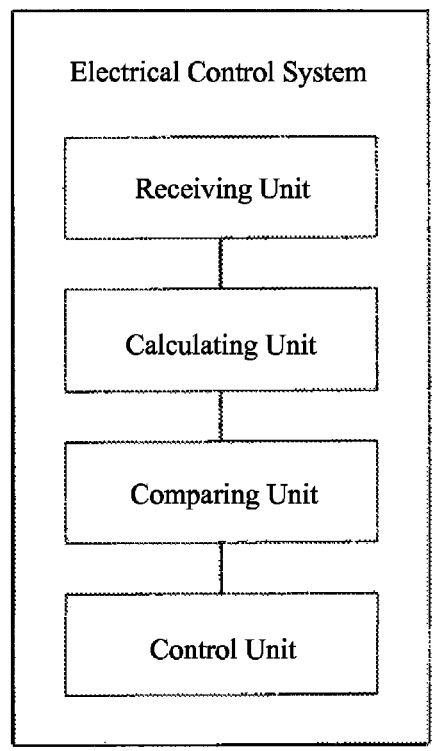
FIG. 5 is a structural block diagram of an electrical control system for controlling the composite motion of a boom of concrete distributing device in the present invention.

FIG. 5 is a structural block diagram of an electrical control system for controlling the composite motion of a boom of concrete distributing device in the present invention. As shown in FIG. 5, the electrical control system for controlling the composite motion of a boom of concrete distributing device comprises: a receiving unit, a calculating unit, a comparing unit, and a control unit.

Wherein, the receiving unit is configured to receive instructions from an operating handle; the calculating unit is configured to calculate the flow of the boom pump, and to calculate the theoretical demanded flows for each of the actuating mechanisms of the boom and the corresponding theoretical control signals for each of the proportional control valves of the actuating mechanism according to the instructions from the operating handle; the comparing unit is configured to compare the total theoretical demanded flow of the actuating mechanisms with the flow of the boom pump; the control unit is configured to provide the theoretical control signals to the proportional control valves when the flow of the boom pump is greater than or equal to the total theoretical demanded flow of the actuating mechanisms, otherwise to provide actual control signals smaller than the theoretical control signals to the proportional control valves and thereby reduce the movement speeds of the actuating mechanisms proportionally.

Figure 1:
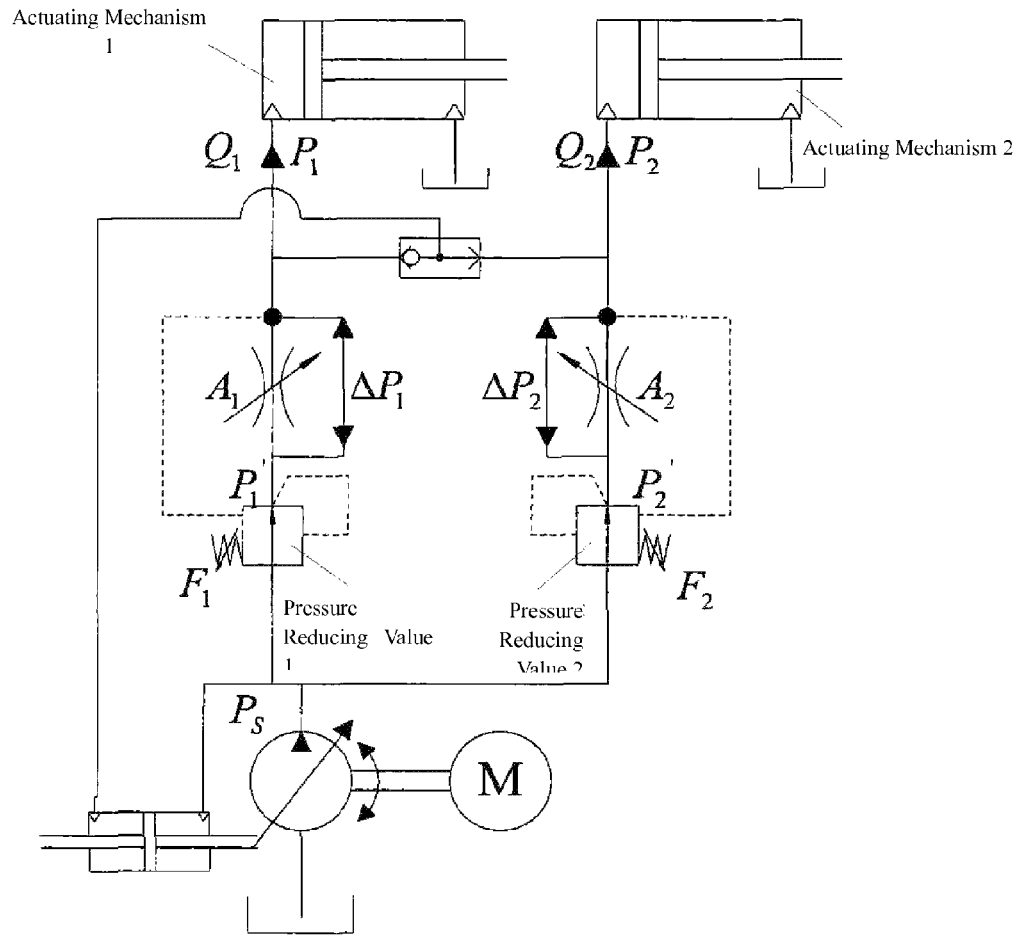
FIG. 1 is a schematic diagram of a load-sensitive hydraulic system with pressure compensation function for controlling the composite motion of a boom of concrete distributing device in the prior art.
Figure 2:
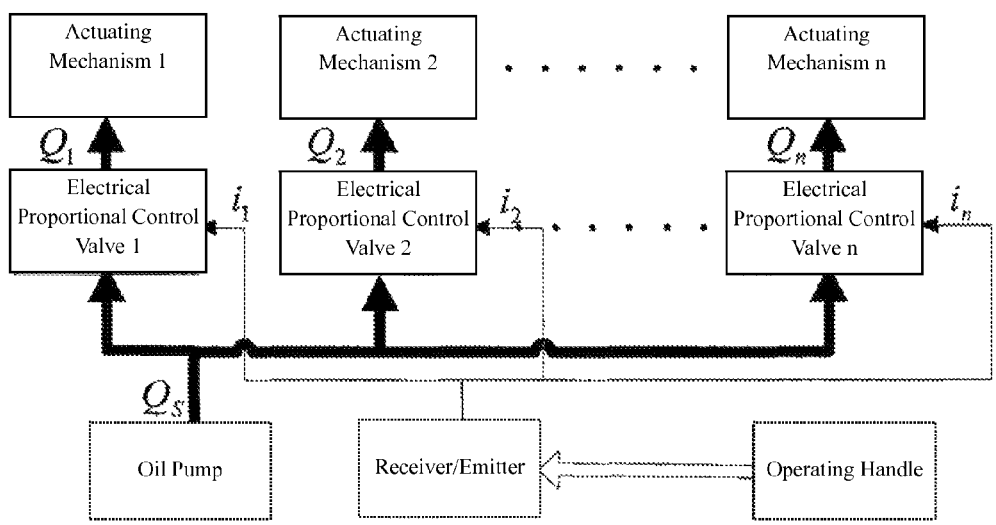
FIG. 2 is a schematic diagram of a control system for controlling the composite motion of a boom of concrete distributing device in the prior art.
Figure 3:
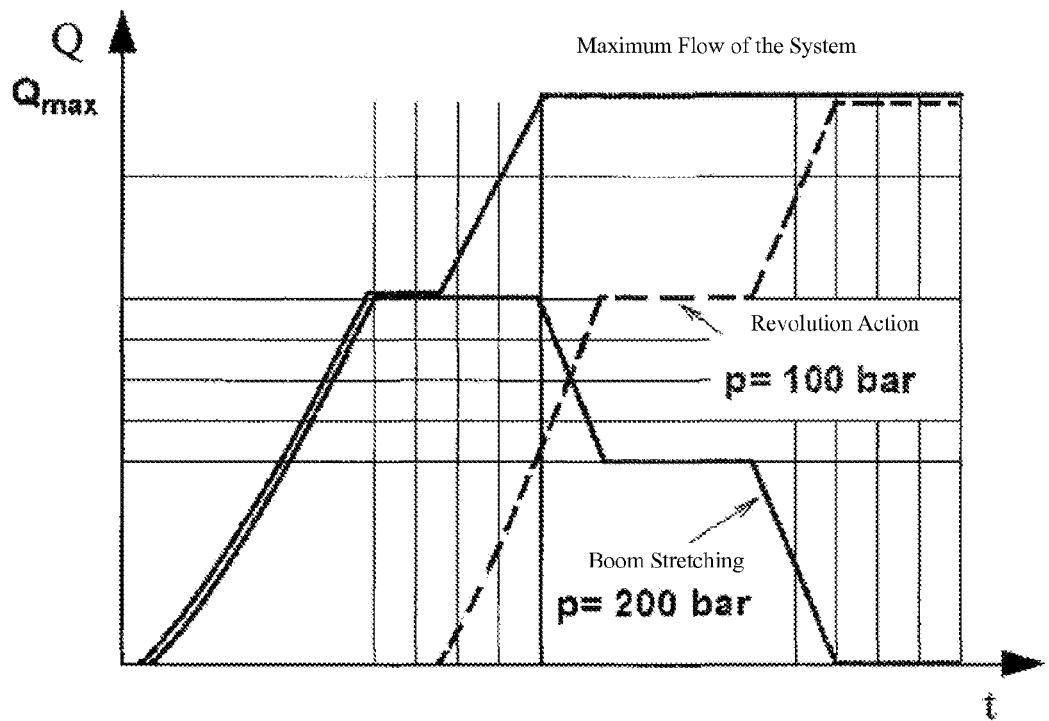
FIG. 3 shows the relation between the flow curves of boom stretching action and revolution action and the flow curve of boom pump output in the prior art.
Figure 6:
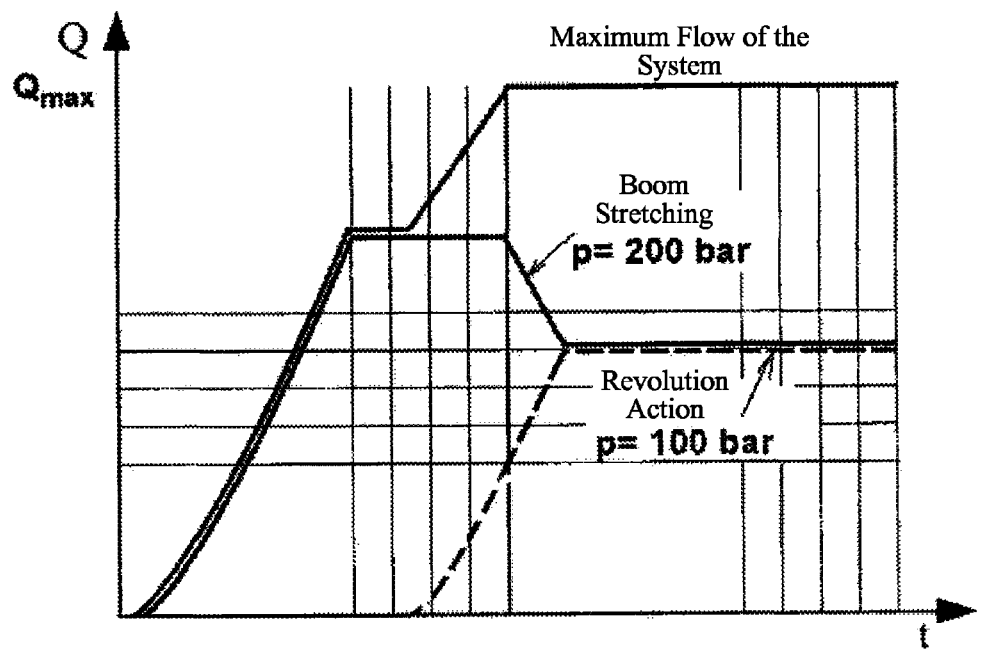
FIG. 6 shows the relation between the flow curves of boom stretching action and revolution action and the flow curve of boom pump output in the electrical control system for controlling the composite motion of a boom of concrete distributing device in the present invention.

In the example of revolution action and boom stretching action of a concrete pump truck, with the present invention, the flow variation trend of the actuating mechanisms shown in FIG. 3 will be shown in FIG. 6. The maximum flow of the system is allocated to the actuating mechanisms for boom stretching and the actuating mechanisms for revolution. Here, the boom stretching action and revolution action are carried out simultaneously, and the movement speeds of the actuating mechanisms are reduced.

While the present invention has been illustrated and described with reference to some preferred embodiments, the present invention is not limited to these embodiments. Those skilled in the art should recognize that various variations and modifications can be made. However, any modification, equivalent replacement, or refinement to the embodiments without departing from the spirit and principle of the present invention shall be deemed as falling into the protecting scope of the present invention.

What is claimed is:

1. A control method for controlling the composite motion of a boom of concrete distributing device comprising the following steps:

calculating the flow of a boom pump when an instruction is sent from an operating handle; and calculating theoretical demanded flows for each actuating mechanism of the boom and theoretical control signals for each electrical proportional control valve corresponding to the actuating mechanisms, according to the instruction sent from the operating handle;

comparing the sum of the theoretical demanded flows for the actuating mechanisms with the flow of the boom pump; and providing the theoretical control signals to the electrical proportional control valves when the flow of the boom pump is greater than or equal to the sum of the theoretical demanded flows of the actuating mechanisms; otherwise providing actual control signals smaller than the theoretical control signals to the electrical proportional control valves, thereby reducing the movement speeds of the actuating mechanism proportionally, wherein the theoretical control signals for the electrical proportional control valves are $i_1, i_2 \ldots i_n$, and the actual control signals are $i_1', i_2' \ldots i_n'$, when the sum of the theoretical demanded flows A of the actuating mechanisms is greater than the flow actually provided by the boom pump B, the actual control signals for the electrical proportional control valves are $i_n'=k*i_n+(1-k)i_{n0}$, where the coefficient $k=B/A$, and $i_{n0}$ is the minimum control signal for the electrical proportional control valves.

2. The control method for controlling the composite motion of a boom according to claim 1, characterized in that, both the theoretical control signals and the actual control signals for the electrical proportional control valves are current signals.

3. The control method for controlling the composite motion of a boom according to claim 1, characterized in that, both the theoretical control signals and the actual control signals for the electrical proportional control valves are voltage signals.

4. The control method for controlling the composite motion of a boom according to claim 1, characterized in that, the flow of the boom pump is calculated according to the rotation speed and the displacement of the boom pump.

5. The control method for controlling the composite motion of a boom according to claim 1, characterized in that, the boom is controlled by a load-sensitive hydraulic system with pressure compensation function.

6. A control system for controlling the composite motion of a boom of concrete distributing device, comprising an electrical control system for controlling the composite motion of a boom of concrete distributing device the electrical control system comprising:

a receiving unit, configured to receive instructions from an operating handle of the concrete distributing device;

a calculating unit, configured to calculate the flow of a boom pump, and calculate theoretical demanded flows for each actuating mechanism of the boom and theoretical control signals for each proportional control valve corresponding to the actuating mechanisms according to the instruction sent from the operating handle;

a comparing unit, configured to compare the sum of the theoretical demanded flows for the actuating mechanisms with the flow of the boom pump; and a control unit, configured to provide the theoretical control signals to the proportional control valves when the flow of the boom pump is greater than or equal to the sum of the theoretical demanded flows of the actuating mechanisms, otherwise provide actual control signals smaller than the theoretical control signals to the proportional control valve and thereby reduce the movement speeds of the actuating mechanisms proportionally, wherein the theoretical control signals for the electrical proportional control valves are $i_1, i_2 \ldots i_n$, and the actual control signals are $i_1', i_2' \ldots i_n'$, when the sum of the theoretical demanded flows A of the actuating mechanisms is greater than the flow actually provided by the boom pump B, the actual control signals for the electrical proportional control valves are $i_n'=k*i_n+(1-k)i_{n0}$, where, the coefficient $k=B/A$, and $i_{n0}$ is the minimum control signal for the electrical proportional control valves.

7. The control system for controlling the composite motion of a boom according to claim 6, characterized in that, the calculating unit calculates the flow of the boom pump according to the displacement of the boom pump and the signals from a sensor detecting the rotation speed of the boom pump.

8. The control system for controlling the composite motion of a boom according to claim 6, characterized in that,
the receiving unit of the electrical control system is connected via signals with the operating handle, and the control unit of the electrical control system is connected via signals with the proportional control valves corresponding to the actuating mechanisms of the boom.

9. The control system for controlling the composite motion of a boom according to claim 8, characterized in that, a receiver/emitter for wireless or wired connection is arranged between the electrical control system and the operating handle.

10. The control system for controlling the composite motion of a boom according to claim 8, characterized in that, the electrical control system is connected via signals with a sensor detecting the rotation speed of the boom pump, and calculates the flow of the boom pump according to the displacement of the boom pump and the signals from the sensor.

11. A concrete distributing device, characterized in that, comprising the control system for controlling the composite motion of a boom of concrete distributing device according to any of claims 6-10.

* * * * *